United States Patent
Takatsuna (10) Patent No.: US 11,861,347 B2
(45) Date of Patent: Jan. 2, 2024

(54) SERVER, UPDATE MANAGING METHOD, NON-TRANSITORY STORAGE MEDIUM, SOFTWARE UPDATING DEVICE, CENTER, AND OTA MASTER

(71) Applicant: TOYOTA JIDOSHA KABUSHIKI KAISHA, Toyota (JP)

(72) Inventor: Yusuke Takatsuna, Ama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 2 days.

(21) Appl. No.: 17/349,070

(22) Filed: Jun. 16, 2021

(65) Prior Publication Data

US 2021/0405994 A1 Dec. 30, 2021

(30) Foreign Application Priority Data

Jun. 26, 2020 (JP) ................... 2020-110693

(51) Int. Cl.
*G06F 8/65* (2018.01)
(52) U.S. Cl.
CPC .................... *G06F 8/65* (2013.01)
(58) Field of Classification Search
USPC ........................................... 717/168
See application file for complete search history.

(56) References Cited

U.S. PATENT DOCUMENTS

| | | | | |
|---|---|---|---|---|
| 2006/0294514 | A1* | 12/2006 | Bauchot | G06F 8/65 717/173 |
| 2014/0059534 | A1* | 2/2014 | Daum | G06F 8/65 717/172 |
| 2016/0364225 | A1* | 12/2016 | Moeller | H04L 67/12 |
| 2017/0300313 | A1* | 10/2017 | Gantt, Jr. | H04L 67/12 |
| 2020/0050378 | A1 | 2/2020 | Sakurai et al. | |
| 2020/0174778 | A1 | 6/2020 | David et al. | |
| 2020/0174779 | A1 | 6/2020 | David et al. | |
| 2020/0249937 | A1 | 8/2020 | Teraoka et al. | |
| 2022/0094684 | A1* | 3/2022 | Komedani | H04L 63/126 |

FOREIGN PATENT DOCUMENTS

| | | |
|---|---|---|
| JP | 2017-134506 A | 8/2017 |
| JP | 2019-074800 A | 5/2019 |
| JP | 2020-004245 A | 1/2020 |

* cited by examiner

*Primary Examiner* — Qing Chen
*Assistant Examiner* — Clint Thatcher
(74) *Attorney, Agent, or Firm* — Oliff PLC (57) ABSTRACT

A server includes: a first storage device storing prerequisite condition information including one or more prerequisite conditions to be satisfied by a vehicle when updating of software of an electronic control unit installed in the vehicle is executed; and one or more processors configured to transmit the prerequisite condition information to the vehicle based on a request from the vehicle.

7 Claims, 6 Drawing Sheets

| VEHICLE ID | PREREQUISITE CONDITION 1 | PREREQUISITE CONDITION 2 | PREREQUISITE CONDITION 3 | ... |
|---|---|---|---|---|
| VID_1001 | PC_001 | PC_002 | | |
| VID_2001 | PC_001 | PC_002 | PC_004 | |
| | | | | |

FIG. 5B

| MAKE ID | PREREQUISITE CONDITION 1 | PREREQUISITE CONDITION 2 | PREREQUISITE CONDITION 3 | ... |
|---|---|---|---|---|
| MODEL_001 | PC_001 | PC_002 | | |
| MODEL_002 | PC_001 | PC_002 | PC_004 | |
| | | | | |

FIG. 6

| VEHICLE ID | ERROR 1 | ERROR 2 | ERROR 3 | ... |
|---|---|---|---|---|
| VID_1001 | PC_003 | | | |
| | | | | |
| | | | | |

SERVER, UPDATE MANAGING METHOD, NON-TRANSITORY STORAGE MEDIUM, SOFTWARE UPDATING DEVICE, CENTER, AND OTA MASTER

CROSS-REFERENCE TO RELATED APPLICATION

This application claims priority to Japanese Patent Application No. 2020-110693 filed on Jun. 26, 2020, incorporated herein by reference in its entirety.

BACKGROUND

1. Technical Field

The present disclosure relates to a server, an update managing method, a storage device (a non-transitory storage medium), a software updating device, a center, and an over-the-air (OTA) master.

2. Description of Related Art

Vehicles have a plurality of electronic control units (ECU) installed onboard, for controlling operations of the vehicle. An ECU is provided with a processor, a transitory storage unit such as random access memory (RAM), and a nonvolatile storage unit such as flash read-only memory (ROM), with the processor executing software stored in the nonvolatile storage unit, thereby realizing control functions of the ECU. The software stored in each ECU is rewritable, and updating to a newer version of the software enables the functions of the ECUs to be improved, new vehicle control functions to be added, and so forth.

Software of the ECUs can be updated using external equipment connected to the vehicle via a diagnostics connector provided to the vehicle in a service garage or the like. Separately, there is a method in which communication equipment provided to an onboard network and a communication network such as the Internet or the like are wirelessly connected, an updating program is downloaded by wireless communication to the vehicle from a server installed in a center, and updating is performed using the downloaded program.

For example, Japanese Unexamined Patent Application Publication No. 2020-004245 (JP 2020-004245 A) describes a program updating device that can acquire control programs by wireless communication from a program providing device provided in a center, and perform updating. The program updating device described in JP 2020-004245 A checks control devices of the vehicle before writing a control program for a control device of the vehicle, and determines in advance whether updating of control programs can be performed successfully. Specific check items exemplified are the state of charge of a battery, weather, location where the vehicle is stopped, and normality of program updating functions.

SUMMARY

When updating a program of a vehicle, the program updating device described in JP 2020-004245 A determines whether program updating processing is executable, based on whether the battery state of charge and information acquired from an automotive navigation system satisfy conditions set in advance.

However, the capacity of the battery installed in the vehicle, and whether equipment such as automotive navigation system and so forth are installed, conceivably differ depending on the make and grade of the vehicle, the way in which options are selected, and so forth. Uniformly setting prerequisite conditions for the vehicle to satisfy when updating software, without taking the configuration of the vehicle into consideration, may possibly lead to cases in which software is not updated in a timely manner due to the set prerequisite conditions not matching the actual configuration of the vehicle.

Accordingly, the present disclosure provides a server, an update managing method, a storage device (a non-transitory storage medium), a software updating device, a center, and an OTA master that can control execution of software updating in accordance with the vehicle configuration and so forth.

A server according to a first aspect of the present disclosure includes: a storage device storing prerequisite condition information including one or more prerequisite conditions to be satisfied by a vehicle when updating of software of an electronic control unit installed in the vehicle is executed; and one or more processors configured to transmit the prerequisite condition information to the vehicle based on a request from the vehicle.

An updating management method according to a second aspect of the present disclosure is executed by a computer provided with a processor, memory, and a non-transitory storage medium. The update managing method includes: storing, in the non-transitory storage medium, prerequisite condition information including one or more prerequisite conditions to be satisfied by a vehicle when updating of software of an electronic control unit installed in the vehicle is executed; and transmitting the prerequisite condition information to the vehicle, based on a request from the vehicle.

A non-transitory storage medium according to a third aspect of the present disclosure stores a program that are executable by a computer provided with a processor, a memory, and the non-transitory storage medium, and that cause the computer to perform a update managing method according to the second aspect.

A software updating device according to a fourth aspect of the present disclosure includes: one or more processors configured to: receive, from a server, prerequisite condition information including one or more prerequisite conditions to be satisfied by a vehicle when updating of software of an electronic control unit installed in the vehicle is executed; determine whether the prerequisite conditions included in the prerequisite condition information acquired by the one or more processors are satisfied; and execute updating of the software of the electronic control unit when determining that all of the prerequisite conditions are satisfied.

According to the present disclosure, a server, an update managing method, a storage device (a non-transitory storage medium), a software updating device, a center, and an OTA master, that can control execution of software updating in accordance with the vehicle configuration and so forth, can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
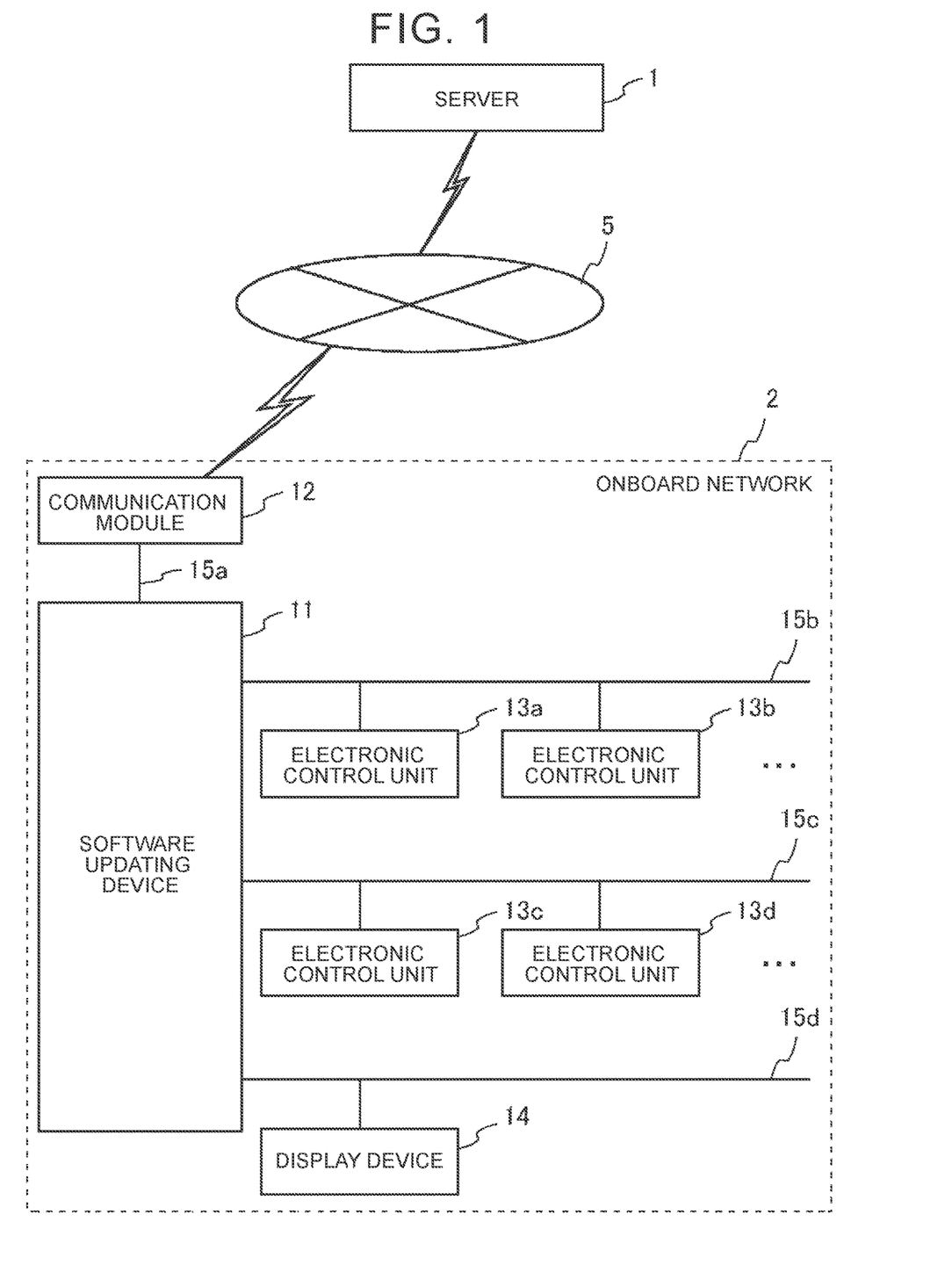
FIG. 1 is a block diagram illustrating an overall configuration of a network system according to an embodiment.
Figure 2:
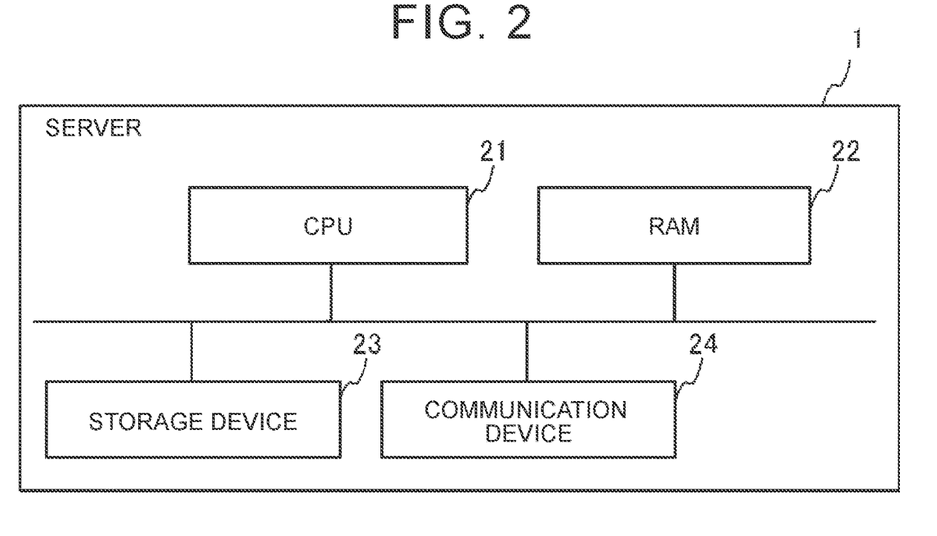
FIG. 2 is a block diagram illustrating a schematic configuration of a server illustrated in FIG. 1.
Figure 3:
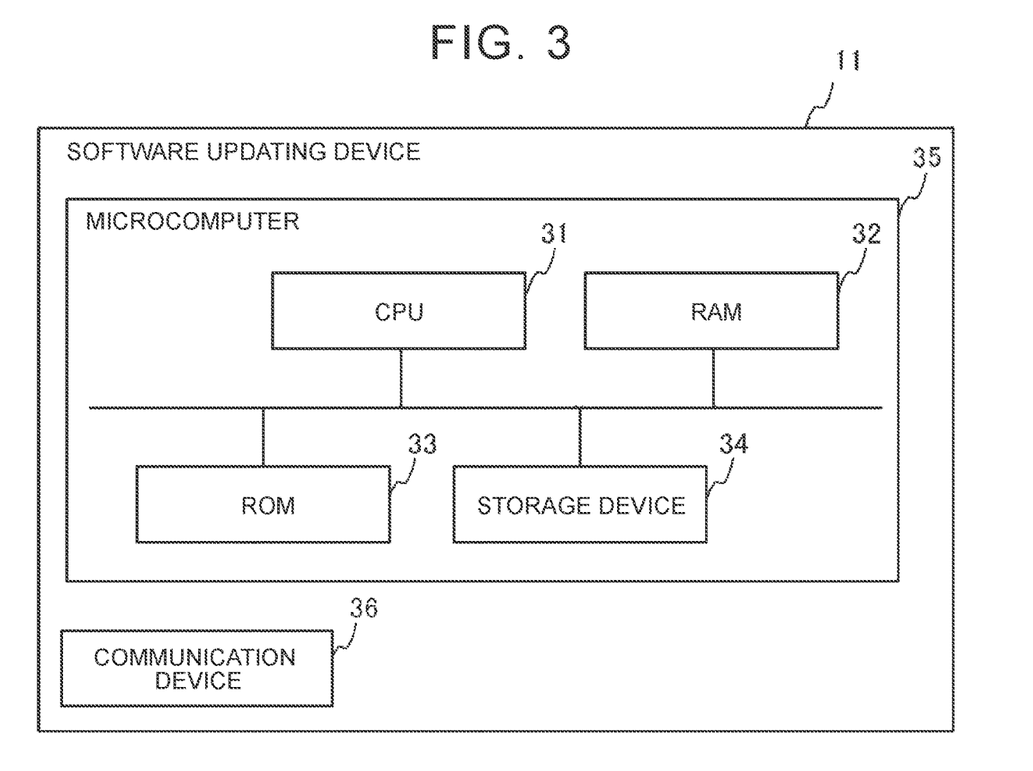
FIG. 3 is a block diagram illustrating a schematic configuration of a software updating device illustrated in FIG. 1.

FIG. 1 is a block diagram illustrating an overall configuration of a network system according to an embodiment, FIG. 2 is a block diagram illustrating a schematic configuration of a server illustrated in FIG. 1, and FIG. 3 is a block diagram illustrating a schematic configuration of a software updating device illustrated in FIG. 1.

The network system illustrated in FIG. 1 is a system for updating software of electronic control units 13a through 13d installed in a vehicle, and is provided with a server (center) 1 and an onboard network 2 installed in the vehicle.

The server 1 is capable of communication with a software updating device 11 installed in the vehicle, via a network 5, and manages information relating to whether there is update data for the electronic control units 13a through 13d installed in the vehicle, and updating processing of software performed by the software updating device 11.

The server 1 is provided with a central processing unit (CPU) 21 (one or more processors), random access memory (RAM) 22, a storage device 23, and a communication device 24, as illustrated in FIG. 2. The storage device 23 is provided with a rewritable storage medium such as a hard disk, a solid state drive (SSD), or the like, and stores software for executing software update managing, and later-described prerequisite condition information and error information. In the server 1, the CPU 21 executes software read out from the storage device 23, using the RAM 22 as a work area, thereby executing later-described control processing. The communication device 24 is equipment for performing communication with the software updating device 11 via the network 5 such as the Internet or the like.

The onboard network 2 is provided with the software updating device 11 (OTA master), a communication module 12, the electronic control units 13a through 13d, and a display device 14. The software updating device 11 is connected to the communication module 12 via a bus 15a, connected to the electronic control units 13a and 13b via a bus 15b, connected to the electronic control units 13c and 13d via a bus 15c, and connected to the display device 14 via a bus 15d. The software updating device 11 is a device that is able to communicate with the server 1 wirelessly (over the air) via the communication module 12 and the network 5, and control updating of software of equipment out of the electronic control units 13a through 13d that is the object of updating, based on update data acquired from the server 1, and later-described prerequisite condition information. The software updating device 11 may also be referred to as a central gateway. The communication module 12 is a communication device that connects the onboard network 2 and server 1 provided in the center. The electronic control units 13a through 13d are ECUs that control operations of various parts of the vehicle, and that include a CPU, RAM, and a nonvolatile storage device such as a flash memory, an electrically erasable programmable ROM (EEPROM), or the like. The CPU executes software stored in the storage device, using the RAM as a work area, thereby executing control functions. The display device 14 (human-machine interface (HMI)) is used to perform various types of display at the time of update processing of software of the electronic control units 13a through 13d, such as a display indicating that update data is available, a display requesting the user for consent to update software, a display of update results, and so forth. Typically, the display device of an automotive navigation system can be used as the display device 14, but the display device 14 is not limited in particular, as long as the display device 14 is able to display information necessary at the time of software update processing. Note that while four electronic control units 13a through 13d are exemplified in FIG. 1, the number of electronic control units is not limited in particular. An electronic control unit may further be connected to the bus 15d illustrated in FIG. 1, besides the display device 14.

As illustrated in FIG. 3, the software updating device 11 is provided with a microcomputer 35 having a CPU 31 (one or more processors), RAM 32, ROM 33, and a storage device 34, and a communication device 36. In the software updating device 11, the CPU 31 of the microcomputer 35 executes software read out from the ROM 33, using the RAM 32 as a work area, thereby executing later-described control processing. The communication device 36 is equipment that performs communication with the communication module 12, the electronic control units 13a through 13d, and the display device 14, via the busses 15a through 15d illustrated in FIG. 1.

Figure 4:
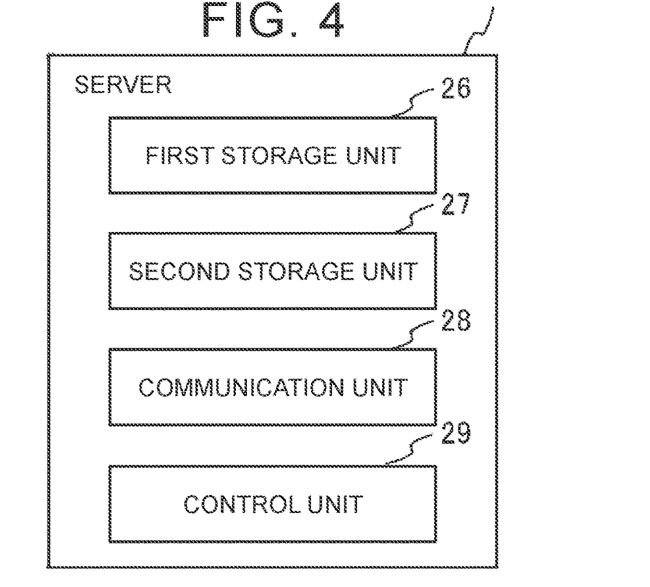
FIG. 4 is a functional block diagram of the server illustrated in FIG. 1.
Figure 5A:
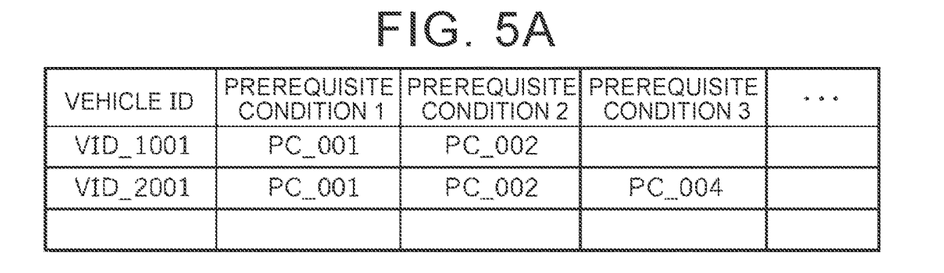
FIG. 5A is a diagram illustrating an example of prerequisite condition information that the server illustrated in FIG. 1 stores.
Figure 5B:
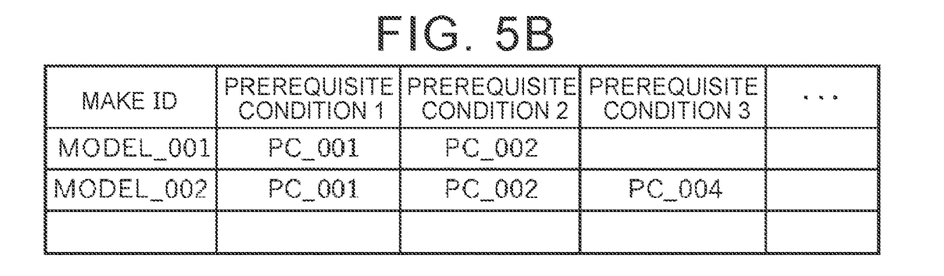
FIG. 5B is a diagram illustrating another example of prerequisite condition information that the server illustrated in FIG. 1 stores.
Figure 6:
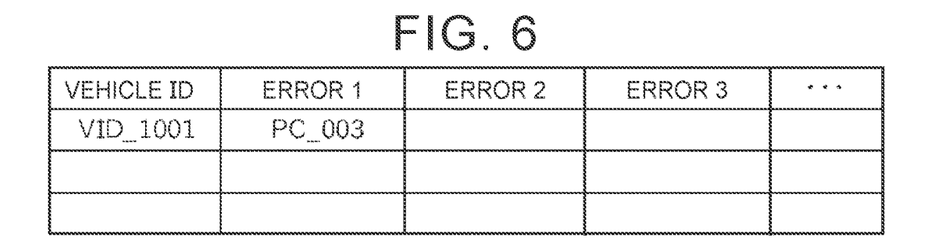
FIG. 6 is a diagram illustrating an example of error information that the server illustrated in FIG. 1 stores.

FIG. 4 is a functional block diagram of the server illustrated in FIG. 1, FIGS. 5A and 5B are diagrams illustrating examples of prerequisite condition information that the server illustrated in FIG. 1 stores, and FIG. 6 is a diagram illustrating an example of error information that the server illustrated in FIG. 1 stores.

The server 1 is provided with a first storage unit 26, a second storage unit 27, a communication unit 28, and a control unit 29. The first storage unit 26 and the second storage unit 27 are realized by the storage device 23 illustrated in FIG. 2, and the communication unit 28 and the control unit 29 are realized by the CPU 21 illustrated in FIG. 2 executing software stored in the storage device 23, using the RAM 22.

The first storage unit 26 stores the prerequisite condition information. The prerequisite condition information is information defining prerequisite conditions that the vehicle is to satisfy at the time of updating the software of one of the electronic control units 13a through 13d in the vehicle. FIGS. 5A and 5B show examples of prerequisite condition information.

The prerequisite condition information shown in FIG. 5A is information in which vehicle IDs that identify vehicles, and prerequisite conditions that the vehicles identified by the vehicle IDs are to satisfy when the software updating devices 11 thereof executes software updating processing in the vehicles identified by the vehicle IDs, are correlated. It is sufficient for the vehicle IDs to be information that uniquely identifies vehicles, and examples thereof include vehicle identification numbers (VIN), frame numbers, or the like. One or more prerequisite conditions may be set as to one vehicle ID. In the example in FIG. 5A, two prerequisite conditions are set as to vehicle ID "VID 1001", and three prerequisite conditions are set as to vehicle ID "VID 2001". The types and number of the prerequisite conditions set for each vehicle ID may be changed in accordance with the grade and equipment of the vehicle identified by the vehicle ID, provision of options, and so forth.

The prerequisite condition information shown in FIG. 5B is information in which make IDs that identify makes, and prerequisite conditions that the vehicles identified by the make IDs are to satisfy when the software updating devices 11 thereof perform software updating processing in the vehicles identified by the make IDs, are correlated. The make IDs typically are information indicating models, but it is sufficient to be information whereby the model of the vehicle can be uniquely identified, and may be expressed by part of or a combination of a plurality of parts of information included in vehicle identification numbers (VIN) or frame numbers. One or more prerequisite conditions can be set to each make ID in the example in FIG. 5B as well.

Now, specific examples of the prerequisite conditions that vehicles are to satisfy at the time of execution of software updating processing will be described. Examples of the prerequisite conditions include state of charge of a battery, operating state of a direct current (DC)-to-DC converter, state of error occurring at an electronic control unit that is the object of updating, installation state of particular sensors or accessories, availability of functions of an electronic control unit that is the object of updating, shift range, vehicle speed, Global Positioning System (GPS) coordinates, and so forth. The battery state of charge and the operating state of the DC-to-DC converter are conditions requesting that electric power necessary for the software updating processing is secured, and a value of the battery state of charge capable of supplying the electric power necessary for the software updating processing and electric power necessary to maintain other functions of the vehicle, and that the DC-to-DC converter that supplies electric power from a traction battery to an accessory battery is running, can be defined as the conditions. The state of error occurring at an electronic control unit that is the object of updating is a condition requesting that an error that would impede execution of the software updating processing at the electronic control unit that is the object of updating (e.g., malfunctioning of the electronic control unit itself, insufficient capacity available at the data storage region, or the data storage region being inaccessible) is not occurring. The installation state of particular sensors or accessories is a condition requesting that equipment such as sensors, accessories, and so forth, necessary for the electronic control unit that is the object of updating to operate are installed in the vehicle. The availability of functions of the electronic control unit that is the object of updating is a condition requesting that settings are made by the user to use the functions of the electronic control unit that is the object of updating. The shift range, vehicle speed, and GPS coordinates are conditions requesting that the vehicle is in a safe state at the time of execution of the software updating processing, and specifically, the shift range of P range, the vehicle speed of 0 km/h, and the current GPS coordinates in a coordinate range other than on a public road, such as in a parking lot or in a space where the vehicle can be stopped, or the like can be defined. Note that these described prerequisite conditions are exemplary, and that other prerequisite conditions can be defined. Also, the prerequisite conditions can be expressed as particular threshold values, numerical value ranges, binary values regarding whether conditions are satisfied, and so forth.

When prerequisite condition information is defined for each vehicle, as shown in FIG. 5A, conditions necessary for the software updating processing can be finely set in accordance with equipment, user settings, and so forth, of each vehicle. On the other hand, when defining the prerequisite condition information for each make, conditions necessary for the software updating processing can be set in a form appropriate for each make, in accordance with battery capacity and differences among equipment depending on makes such as sensors and the like that are installed, as illustrated in FIG. 5B.

The second storage unit 27 stores error information. The error information is information identifying, out of the prerequisite information included in the prerequisite condition information transmitted to the software updating device 11, prerequisite conditions determined by the software updating device 11 not to be satisfied, before starting or during execution of the software updating processing by the software updating device 11. The error information is information in which the vehicle ID identifying the vehicle and the prerequisite condition regarding which an error occurred at the time of software updating processing are correlated. The error information may include information of the date and time at which the error occurred due to not satisfying a prerequisite condition. The error information stored in the second storage unit 27 can be used as information to identify the cause with which the software updating processing was not successfully executed, perform individual handling necessary for software updating processing for each vehicle, and so forth.

Based on a request from the software updating device 11, the communication unit 28 acquires prerequisite condition information to be applied to this software updating device 11 from the first storage unit 26, and transmits the acquired prerequisite condition information to the software updating device 11. Also, the communication unit 28 receives, from the software updating device 11, error information including prerequisite conditions determined by the software updating device 11 not to be satisfied at the time of software updating processing, out of all prerequisite information included in the prerequisite condition information transmitted to the software updating device 11. The communication unit 28 causes the aforementioned second storage unit 27 to store the received error information, for each vehicle. Also, the communication unit 28 accepts various types of requests (later-described update confirmation requests for software and transmission requests for prerequisite condition information) transmitted from the software updating device 11.

The control unit 29 sets prerequisite conditions for the vehicle corresponding to the error information, based on the error information received from the software updating device 11. A conceivable example of setting prerequisite conditions based on error information is to temporarily ease part of the prerequisite conditions that the vehicle is to satisfy. For example, a case can be assumed in which the battery state of charge is set as a prerequisite condition that the vehicle is to satisfy at the time of software updating processing. The battery state of charge (r1) set as the prerequisite condition is set to a value obtained by adding a certain margin to a minimum state of charge (r0) necessary for the software updating processing and for maintaining functions of the vehicle. When software updating is not performed due to an error of the battery state of charge not satisfying the prerequisite condition, the battery state of charge for the prerequisite condition is set to a value that is higher than the minimum state of charge (r0) and is lower than the initially-set battery state of charge (r1). Thus, the error can be resolved and software updating can be performed in a timely manner.

Figure 7:
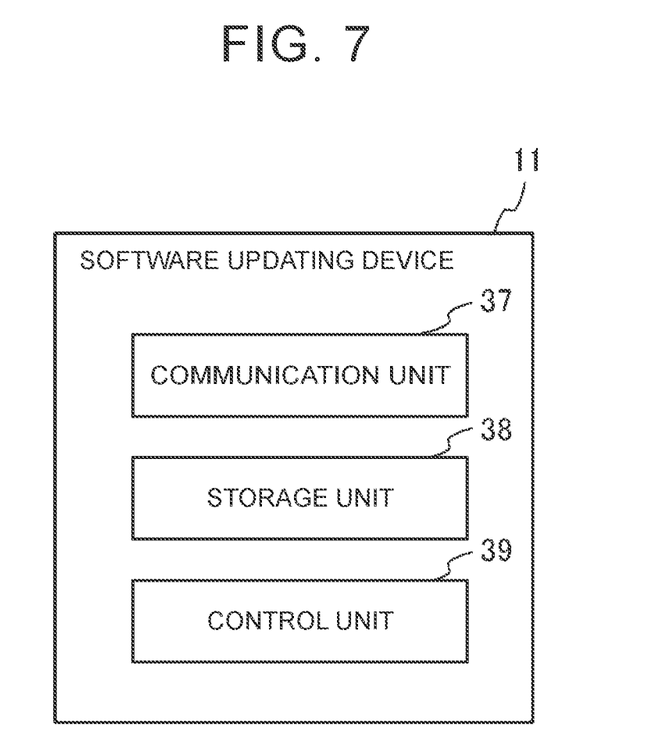
FIG. 7 is a functional block diagram of the software updating device illustrated in FIG. 1.

FIG. 7 is a functional block diagram of the software updating device illustrated in FIG. 1.

The software updating device 11 is provided with a communication unit 37, a storage unit 38, and a control unit 39. The communication unit 37 and the control unit 39 are realized by the CPU 31 illustrated in FIG. 3 executing software stored in the ROM 33 using the RAM 32, and the storage unit 38 is realized by the storage device 34 illustrated in FIG. 3.

The communication unit 37 transmits a confirmation request to the server 1 at a predetermined timing, such as a timing when the power source or the ignition of the vehicle is turned on, or the like, to confirm whether there is update data for the software of the electronic control units 13a through 13d, and receives confirmation results (information indicating whether there is update data) at the server 1. Also, the communication unit 37 transmits a download request for a distribution package to the server 1, and receives the distribution package transmitted from the server 1. The distribution package transmitted from the server 1 includes update data to be used for software updating of one or more electronic control units that are the objects of updating, and the above-described prerequisite condition information. The distribution package may contain verification data for verifying authenticity of the update data, number of pieces of update data, order of installation, and various types of control information used when updating software, and so forth. The communication unit 37 causes the storage unit 38 to store the received distribution package. The communication unit 37 verifies the authenticity of the received update data. The communication unit 37 also transmits error information generated by the later-described control unit 39 to the server 1.

The storage unit 38 stores the distribution package that the communication unit 37 has received from the server 1.

The control unit 39 controls the software updating of the electronic control units 13a through 13d of the vehicle in which the software updating device 11 is installed.

The control unit 39 references the prerequisite condition information included in the distribution package that the communication unit 37 has received from the server 1, and determines whether the prerequisite conditions included in the prerequisite condition information are satisfied. The control unit 39 acquires information relating to the state of the vehicle from the electronic control units 13a through 13d connected via the busses 15b and 15c, and determines whether the prerequisite conditions included in the prerequisite condition information are satisfied, based on the acquired information. Examples of information relating to the state of the vehicle include the battery state of charge, the operating state of the DC-to-DC converter, errors occurring at each of the electronic control units 13a through 13d, the availability and operation state of equipment such as sensors, accessories, and so forth, connected to the electronic control units 13a through 13d, the shift range, the vehicle speed, the GPS coordinates, and so forth.

When determining that all prerequisite conditions included in the prerequisite condition information are satisfied, the control unit 39 executes installation and activation of the electronic control units that are the objects of updating. Note that the electronic control unit that is the object of updating can be identified based on information included in the distribution package (identification information of the electronic control unit correlated with the update data).

Now, software updating processing includes the three phases of downloading, in which update data is transmitted from the server 1 to the vehicle, installation in which the downloaded update data is transferred to the electronic control unit that is the object of updating and is written to the storage region of the electronic control unit that is the object of updating, and activation in which the update program installed in the electronic control unit that is the object of updating is enabled.

Downloading is processing of receiving and storing update data that is transmitted from the server 1, for updating software of an electronic control unit. The downloading phase includes not only reception of update data, but also includes a series of processing relating to downloading, such as determining whether execution of downloading is permissible, verifying the update data, and so forth. Installation is processing of causing the electronic control unit that is the object of updating to write an update-version program (update software) to a storage unit of onboard equipment, based on the downloaded update data. The installation phase includes not only execution of installing, but also includes control of a series of processing relating to installation, such as determining whether installation is permissible, transferring the update data, verifying the update-version program, and so forth. Activation is processing of enabling (activating) the installed update-version program. The control of activation includes not only execution of activation, but also includes control of a series of processing relating to activating, such as determining whether execution of activation is permissible, verifying the execution results, and so forth.

The update data transmitted from the server 1 to the software updating device 11 may contain any of update software for electronic control units, compressed data in which update software has been compressed, and divided data in which update software or compressed data has been divided. Also, the update data may contain an identifier for identifying the electronic control unit that is the object of updating (ECU ID), and an identifier for identifying software before updating (ECU software ID). The update data is downloaded as the aforementioned distribution package, and the distribution package contains update data of one or a plurality of electronic control units.

When the update data includes the update software itself, the software updating device transfers the update data (update software) to the electronic control unit that is the object of updating in the installation phase. Also, when the update data includes compressed data, differential data, or divided data of the update software, the software updating device 11 may transfer the update data to the electronic control unit that is the object of updating and the electronic control unit that is the object of updating may generate the update software from the update data, or the software updating device 11 may generate the update software from the update data, and transfer the update software to the electronic control unit that is the object of updating. Now, generating the update software can be performed by decompressing compressed data, or assembling differential data or divided data.

Installation of the update software can be performed at the electronic control unit that is the object of updating, based on an installation request from the software updating device 11. Alternatively, the electronic control unit that is the object of updating, which has received the update data, may autonomously install the update software without receiving any explicit instruction from the software updating device 11.

Activation of the update software can be performed at the electronic control unit that is the object of updating, based on an activation request from the software updating device 11. Alternatively, the electronic control unit that is the object of updating, which has received the update data, may autonomously activate the update software without receiving any explicit instruction from the software updating device 11.

Note that updating processing of software can be performed consecutively or in parallel on each of the electronic control units.

Upon the control unit 39 determining that all prerequisite conditions included in the prerequisite condition information are satisfied, the control unit 39 transfers one or more pieces of received update data to the electronic control units that are the objects of updating and the electronic control units that are the objects of updating perform installation of the update data. When installation is completed, the control unit 39 requests the electronic control units that are the objects of updating to activate the updated software, and the electronic control units that are the objects of updating perform activation. When there is only one software storage region provided to the storage device of the electronic control units, installation and activation are performed as a sequence. The control unit 39 performs the above control processing, thereby completing the software updating of the electronic control units that are the objects of updating.

Note that the "software updating processing" in the present specification is not limited to processing in which downloading, installation, and activation are all performed continuously, and includes processing of performing only part of the downloading, installation, and activation.

Control processing that the server 1 and the software updating device 11 execute will be described below.

Figure 8:
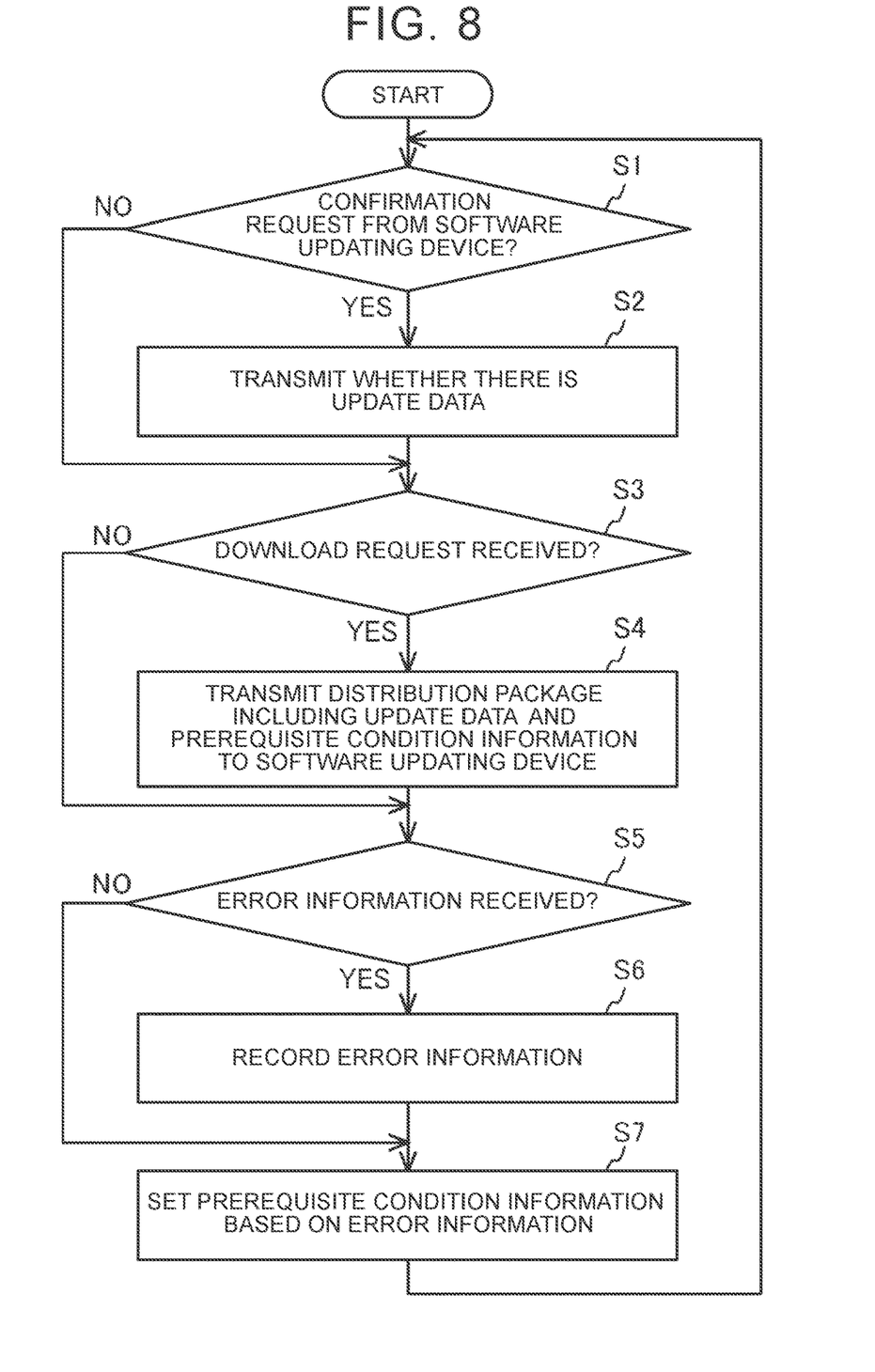
FIG. 8 is a flowchart showing an example of control processing that the server according to the embodiment executes.

FIG. 8 is a flowchart showing an example of control processing that the server according to the embodiment executes. The control processing shown in FIG. 8 is repeatedly executed at the server 1 at predetermined time intervals, for example.

In step S1, the communication unit 28 determines whether a confirmation request for whether there is update data has been received from the software updating device 11. When the determination in step S1 is YES, the processing advances to step S2, and otherwise, the processing advances to step S3.

In step S2, the communication unit 28 determines whether there is update data for the vehicle in which the software updating device 11 that transmitted the confirmation request is installed, and transmits information indicating whether there is update data to the software updating device 11. Whether there is update data can be determined based on management information stored in the storage device 23 or another server connected to the server 1. Thereafter, the processing advances to step S3.

In step S3, the communication unit 28 determines whether a download request for a distribution package has been received from the software updating device 11. When the determination in step S3 is YES, the processing advances to step S4, and otherwise, the processing advances to step S5.

In step S4, the communication unit 28 generates a distribution package including update data for updating the software of the electronic control units of the vehicle that transmitted the download request and prerequisite condition information corresponding to this vehicle, and transmits the generated distribution package to the software updating device 11. Thereafter, the processing advances to step S5.

In step S5, the communication unit 28 determines whether error information has been received from the software updating device 11. When the determination in step S5 is YES, the processing advances to step S6, and otherwise, the processing advances to step S7.

In step S6, the communication unit 28 causes the second storage unit 27 to store the received error information. Thereafter, the processing advances to step S7.

In step S7, the prerequisite condition information stored in the first storage unit 26 is set (updated) by the control unit 29 based on the error information stored in the second storage unit 27. Note that in the example in FIG. 8, setting of prerequisite condition information based on error information is periodically executed at a predetermined cycle, but setting processing of the prerequisite condition information may be performed based on error information when instructed by an operator at the center, a mechanic at a dealer, or the like. Thereafter, the processing advances to step S1.

Figure 9:
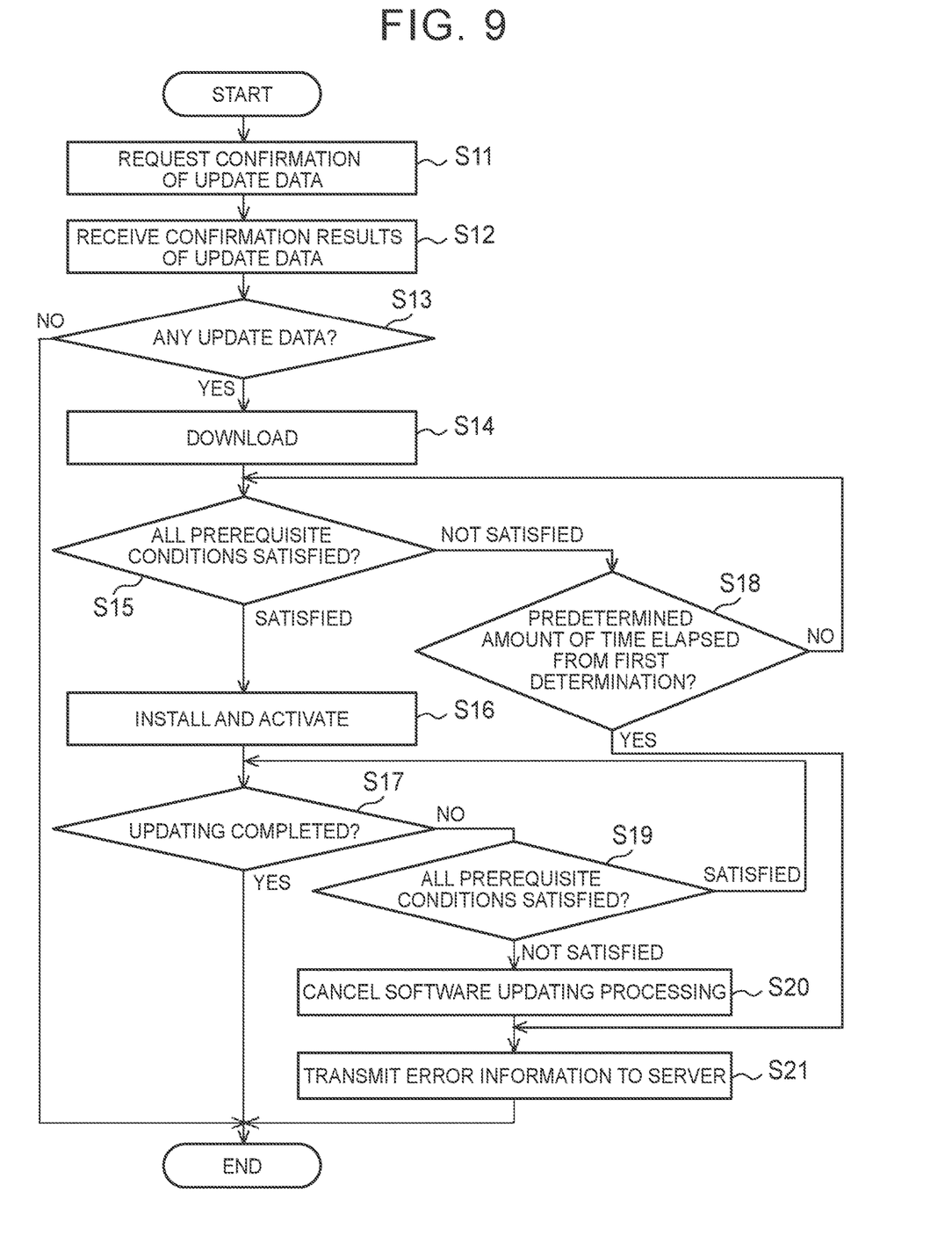
FIG. 9 is a flowchart showing an example of control processing that the software updating device according to the embodiment executes.

FIG. 9 is a flowchart showing an example of control processing that the software updating device according to the embodiment executes. The control processing shown in FIG. 9 is processing that is started with the power source or ignition of the vehicle being turned on, for example, as a trigger.

In step S11, the communication unit 37 transmits a confirmation request to the server 1 requesting confirmation of whether there is update data for the electronic control units 13a through 13d connected to the software updating device 11. Thereafter, the processing advances to step S12.

In step S12, the communication unit 37 receives the confirmation results acquired from the server 1. Thereafter, the processing advances to step S13.

In step S13, the control unit 39 determines whether there is update data, based on the confirmation results acquired from the server 1. When the determination in step S13 is YES, the processing advances to step S14, and otherwise, the processing ends.

In step S14, the communication unit 37 executes downloading processing. More specifically, the communication unit 37 transmits a download request for a distribution package to the server 1, receives the distribution package transmitted in response to the download request, and stores the received distribution package in the storage unit 38. The communication unit 37 verifies the authenticity of the update data included in the received distribution package. Determination of whether execution of downloading is permissible, and notification to the server 1 that downloading is completed, may be performed in step S14. Thereafter, the processing advances to step S15.

In step S15, the control unit 39 determines whether all of the prerequisite conditions included in the prerequisite condition information acquired from the server 1 are satisfied. When determining that all prerequisite conditions are satisfied in step S15, the processing advances to step S16, and otherwise, advances to step S18.

In step S16, the control unit 39 executes installation processing and activation processing as to the electronic control units that are the objects of updating. The installation processing in step S16 includes processing of requesting the user for consent to install, and accepting input of the consent, transferring update data from the software updating device 11 to the electronic control units that are the objects of updating, requesting the electronic control units that are the objects of updating to perform installation, requesting verification of installation to the electronic control units that are the objects of updating, and so forth. The electronic control units that are the objects of updating use the update data received from the software updating device 11 and install the update version of the software in a storage region. The activation processing includes processing of requesting the user for consent to activate, and accepting input of the consent, requesting the electronic control units that are the objects of updating to perform activation, and so forth. The electronic control units that are the objects of updating switch the software to be executed to the update-version software, thereby enabling and starting the update-version software. Thereafter, the processing advances to step S17.

In step S17, the control unit 39 determines whether the software updating processing is completed. When the determination in step S17 is YES, the processing ends, and otherwise, the processing advances to step S19.

In step S18, the control unit 39 determines whether a predetermined amount of time has elapsed from the point in time at which the determination in step S15 was first made. Even when not all prerequisite conditions are satisfied in the determination in step S15, prerequisite conditions not satisfied conceivably may be satisfied later. For example, a case can be assumed in which one prerequisite condition that "shift range is P range" is not satisfied at the time of determination in step S15, but the user soon shifts the shift range to the P range. In this case, executing installation and activation at the point in time when all prerequisite conditions are satisfied, rather than processing as an error (i.e., neither installation nor activation can be executed since all prerequisite conditions are not satisfied) based on the determination in step S15 is considered to suit the convenience of the user. Accordingly, in the present embodiment, a step S18 is provided, and the determination of prerequisite conditions in step S15 is repeated as long as a predetermined amount of time has not elapsed from the first determination in step S15. When the determination in step S18 is YES, the processing advances to step S21, and otherwise, the processing advances to step S15. Note that when the determination in step S18 is NO, there may be a predetermined interval time for standing by before advancing to step S15.

In step S19, the control unit 39 determines whether all prerequisite conditions included in the prerequisite condition information acquired from the server 1 are satisfied. The determination processing in step S19 is processing for confirming that all prerequisite conditions continue to be satisfied after the installation and activation in step S16 are started. When determination is made in step S19 that not all prerequisite conditions are satisfied, the processing advances to step S20, and otherwise, the processing advances to step S17.

In step S20, the control unit 39 cancels the installation and activation. Thereafter, the processing advances to step S21.

In step S21, the communication unit 37 generates error information including the prerequisite conditions regarding which the control unit 39 determined in step S19 not to be satisfied, and transmits the generated error information to the server 1. Thereafter, the processing ends.

As described above, the server 1 according to the present embodiment stores prerequisite conditions to be satisfied by the vehicle at the time of updating software, and transmits the prerequisite conditions in response to a request from the software updating device 11. Accordingly, the prerequisite conditions to be satisfied by the vehicle at the time of updating software can be set in accordance with the configuration of the vehicle. As a specific example, assumption will be made that there is a vehicle of model A that has a relatively large battery capacity, and a vehicle of model B that has a relatively small battery capacity, and the same state of charge (SOC) value (battery state of charge) is set as a prerequisite condition for software updating. In this case, even when the SOC value is below the SOC value set as the prerequisite condition, there may be sufficient electric power to execute the software updating processing actually left in the battery of the vehicle of model A, since the battery capacity is large. In this case, setting the prerequisite conditions uniformly for model A and model B may result in software updating processing not being performed in a timely manner for model A. According to the present embodiment, prerequisite conditions for software updating processing can be set at the server 1 for each vehicle or each model, and the prerequisite condition information is transmitted in response to a download request from the software updating device 11. Accordingly, prerequisite conditions necessary for software updating processing can be centrally managed at the server 1 side, and the prerequisite conditions can be changed as appropriate.

Also, the server 1 can accumulate the prerequisite conditions that the software updating device 11 determines not to be satisfied at the time of software updating processing, as error information for each vehicle, and accordingly the server 1 can manage the state of errors occurring at the time of software updating in each vehicle, and can handle each vehicle individually (individual software updating processing) based on the error information.

Also, the software updating device 11 according to the present embodiment acquires prerequisite conditions to be satisfied at the time of software updating processing from the server 1, and performs software updating processing when the acquired prerequisite conditions are satisfied. Accordingly, the server 1 can set prerequisite conditions to be satisfied by the vehicle at the time of updating software in accordance with the configuration of the vehicle.

Also, the software updating device 11 can transmit prerequisite conditions determined not to not be satisfied at the time of software updating processing to the server as error information, and accordingly the state of errors at the time of software updating processing at the vehicle can be aggregated at the server 1.

Also, when one of the prerequisite conditions is no longer satisfied after the software updating processing is started, the software updating device 11 cancels the software updating, and accordingly a situation where the software updating processing is continued under inappropriate conditions can be suppressed from occurring.

Also, even when the software updating device 11 determines that not all necessary prerequisite conditions are satisfied at the time of software updating processing, software updating is started when the prerequisite conditions are satisfied before a predetermined amount of time elapses, and accordingly opportunities to enable software updating can be sufficiently secured.

The functions of the server 1 exemplified as an embodiment can also be realized as an updating management method executed by a computer provided with a processor (CPU), a memory, and a storage device, or as an updating management program for the computer to execute, and as a computer-readable non-transitory storage medium storing the updating management program. In the same way, the functions of the software updating device 11 exemplified as an embodiment can also be realized as an update control method executed by an onboard computer provided with a processor (CPU), a memory, and a storage device, as an update control program for the onboard computer to execute, and as a computer-readable non-transitory storage medium storing the update control program.

In the above embodiment, an example has been described in which the software updating device 11 provided in an onboard network at the vehicle side performs software updating control of all of the electronic control units 13a through 13d, as a master device, but an arrangement may be made where one of the electronic control units 13a through 13d has the update control functions shown in FIGS. 8 and 9, and software updating of the other electronic control units is controlled thereby, instead of the software updating device 11 being provided. Also, an arrangement may be made where the update control functions shown in FIGS. 8 and 9 are provided to external equipment that is capable of wired connection with the onboard network 2, and software updating processing of the electronic control units 13a through 13d is performed using this external equipment, instead of providing the software updating device 11.

The technology of the present disclosure can be used in network systems for updating software of electronic control units.

A server according to an aspect of the present disclosure includes: a storage device storing prerequisite condition information including one or more prerequisite conditions to be satisfied by a vehicle when updating of software of an electronic control unit installed in the vehicle is executed; and one or more processors configured to transmit the prerequisite condition information to the vehicle based on a request from the vehicle.

An updating management method according to another aspect of the present disclosure is executed by a computer provided with a processor, memory, and a storage device. The update managing method includes: storing, in the storage device, prerequisite condition information including one or more prerequisite conditions to be satisfied by a vehicle when updating of software of an electronic control unit installed in the vehicle is executed; and transmitting the prerequisite condition information to the vehicle, based on a request from the vehicle.

A non-transitory storage medium according to another aspect of the present disclosure stores a program that are executable by a computer provided with a processor, a memory, and the non-transitory storage medium, and that cause the computer to perform a update managing method comprising: storing, in the non-transitory storage medium, prerequisite condition information including one or more prerequisite conditions to be satisfied by a vehicle when updating of software of an electronic control unit installed in the vehicle is executed; and transmitting the prerequisite condition information to the vehicle, based on a request from the vehicle.

A software updating device according to another aspect of the present disclosure includes: one or more processors configured to: receive, from a server, prerequisite condition information including one or more prerequisite conditions to be satisfied by a vehicle when updating of software of an electronic control unit installed in the vehicle is executed; determine whether the prerequisite conditions included in the prerequisite condition information acquired by the one or more processors are satisfied; and execute updating of the software of the electronic control unit when determining that all of the prerequisite conditions are satisfied.

A center according to another aspect of the present disclosure includes: a storage device storing prerequisite condition information including one or more prerequisite conditions to be satisfied by a vehicle when updating of software of an electronic control unit installed in the vehicle is executed; and one or more processors configured to transmit the prerequisite condition information to the vehicle based on a request from the vehicle.

An over-the-air (OTA) master according to another aspect of the present disclosure includes: one or more processors configured to: receive, from a center, prerequisite condition information including one or more prerequisite conditions to be satisfied by a vehicle when updating of software of an electronic control unit installed in the vehicle is executed; determine whether the prerequisite conditions included in the prerequisite condition information acquired by the one or more processors are satisfied; and start updating of the software of the electronic control unit when determining that all of the prerequisite conditions are satisfied.

What is claimed is:

1. A server comprising:
a non-transitory storage medium storing prerequisite condition information including one or more prerequisite conditions to be satisfied by a vehicle when updating software of an electronic control unit installed in the vehicle; and
one or more processors configured to
acquire, based on a request from a software updating device mounted in the vehicle, a piece of the prerequisite condition information corresponding to the software updating device from the prerequisite condition information,
transmit the piece of the prerequisite condition information corresponding to the software updating device to the vehicle,
receive, from the vehicle, error information including a prerequisite condition determined not to be satisfied by the vehicle, out of all the prerequisite conditions included in the prerequisite condition information, and
ease and set the prerequisite condition determined not to be satisfied by the vehicle, based on the error information.

2. An update managing method executed by a computer provided with a processor, memory, and a non-transitory storage medium, the method comprising:
storing, in the non-transitory storage medium, prerequisite condition information including one or more prerequisite conditions to be satisfied by a vehicle when updating of software of an electronic control unit installed in the vehicle is executed;
acquiring, based on a request from a software updating device mounted in the vehicle, a piece of the prerequisite condition information corresponding to the software updating device from the prerequisite condition information;
transmitting the piece of the prerequisite condition information corresponding to the software updating device to the vehicle;
receiving, from the vehicle, error information including a prerequisite condition determined not to be satisfied by the vehicle, out of all the prerequisite conditions included in the prerequisite condition information; and
easing and setting the prerequisite condition determined not to be satisfied by the vehicle, based on the error information.

3. A non-transitory storage medium storing a program that are executable by a computer provided with a processor, a memory, and the non-transitory storage medium, and that cause the computer to perform the update managing method according to claim 2.

4. A software updating device comprising one or more processors configured to:
   transmit a request regarding software updating to a server;
   receive, from the server, prerequisite condition information including one or more prerequisite conditions to be satisfied by a vehicle when updating software of an electronic control unit installed in the vehicle, the prerequisite condition information being based on the request;
   determine whether the prerequisite conditions included in the prerequisite condition information acquired by the one or more processors are satisfied;
   update the software of the electronic control unit when determining that all of the prerequisite conditions are satisfied;
   when not all of the prerequisite conditions are satisfied, transmit, to the server, error information including a prerequisite condition that is not satisfied; and
   after transmitting the error information, receive and set the prerequisite condition that is not satisfied to a value that is eased respective to when the error information was transmitted.

5. The software updating device according to claim 4, wherein the one or more processors are configured to, when determining that not all of the prerequisite conditions are satisfied after starting updating of the software, cancel updating of the software.

6. The software updating device according to claim 4, wherein the one or more processors are configured to, when determining that all of the prerequisite conditions are satisfied before a predetermined amount of time elapses after determining that not all of the prerequisite conditions are satisfied, start updating of the software.

7. The server according to claim 1, wherein
   the non-transitory storage medium is configured to store the prerequisite condition information including information correlated with a prerequisite condition to be satisfied by the vehicle, which is at least one of (i) identified by a vehicle identification or (ii) identified by a make of the vehicle.

* * * * *